Inventor:
Willi Hemmert
By
[signature]

Inventor:
Willi Hemmert

June 18, 1968   W. HEMMERT   3,388,477
APPARATUS FOR CHECKING TOOTH FLANKS, ESPECIALLY
OF INVOLUTE STRAIGHT AND HELICAL SPUR GEARS
Filed Sept. 20, 1965   6 Sheets-Sheet 4

Fig.5

Inventor:
Willi Hemmert
By

Fig.7

United States Patent Office 3,388,477
Patented June 18, 1968

3,388,477
APPARATUS FOR CHECKING TOOTH FLANKS,
ESPECIALLY OF INVOLUTE STRAIGHT AND
HELICAL SPUR GEARS
Willi Hemmert, Wipperfurth, Germany, assignor to
W. Ferd. Klingelnberg Söhne, Remscheid, Germany
Filed Sept. 20, 1965, Ser. No. 488,519
Claims priority, application Germany, Sept. 19, 1964,
K 54,040
10 Claims. (Cl. 33—179.5)

The present invention relates to a device for checking tooth flanks, especially involute straight and helical spur gears. An apparatus for checking tooth blanks of involute straight and helical spur gears should permit the checking of the involute as well as the checking of the direction of the flank (angle of tooth). A number of devices which have these checking possibilities have been developed heretofore. According to one of these devices, the guiding of the measuring feeler on the rated involute of the gear is in a manner known per se effected by causing a rolling ruler connected to a carriage through the intervention of a rolling disc having the diameter of the rated base circle of the gear, to rotate said gear during the displacement of the carriage by a base circle arc corresponding to the displacement of the carriage. In this connection, the measuring feeler is supported by said carriage and is movable tangentially with regard to the circumference of the gear and is adjusted so as to be spaced from the axis of the work piece to be checked by the distance of the base circle radius. The guiding of the measuring feeler on a rated helical line of the tooth flank, as is required for measuring the angle of tooth is, with this device, brought about by the fact that the carriage carrying the measuring feeler and movable on guiding means extending parallel to the axis of the work piece to be checked drives the rolling ruler through the intervention of a sliding block, and through the intervention of a straight guide angularly adjustably connected to said carriage, the said rolling ruler being displaceable in guiding means of the tangential carriage and parallel thereto.

The said ruler, through the intervention of the rolling disc turns the work piece to be checked, with a corresponding adjustment of the angle of the straight guide, by the helical angle, which is required for the axial displacement stroke of the measuring feeler.

With this type of device, due to the angular adjustability of the straight guide means, an infinitely variable adjustment of the helical angle to be checked, is possible. However, the range within which the helical angle to be checked can be checked is limited by the fact that when approaching the self-locking angle, considerable forces occur on the straight guide so that the angle of tooth of work pieces with very great angles, as is the case, for instance, with involute worms, cannot be checked. For purposes of checking involutes, rolling discs are required which have a corresponding base circle diameter.

In order to overcome the just-mentioned drawback, the last-mentioned device has been further developed by employing a transfer lever known in connection with heretofore known devices for checking the involute only. This transfer lever adjusts the stroke of the rolling ruler rolling on a rolling disc fixedly arranged in the apparatus, with regard to the stroke of the measuring feeler, in conformity with the ratio of the diameter of the rolling disc with regard to the base circle diameter of the work piece to be checked. In this way, this apparatus becomes infinitely variable adjustable with regard to the base circle diameter for the checking of the involute and also with regard to the checking of the angle of slope or lead. While for the checking range of the angle of slope also in this instance there exist the limits mentioned above, additional difficulties occur with regard to the adjustable base circle diameter. These difficulties are caused by the forces occurring on the transfer lever when the base circle of the work piece to be checked becomes considerably less than that of the built-in rolling disc. These difficulties are obviously the reason why, with the only heretofore known device of the last-mentioned type, the adjustable base circle diameter cannot exceed a certain limit.

According to another heretofore known apparatus of the type involved, the infinitely variable adjustment of the base circle is likewise effected by means of a transfer lever. For purposes of checking the angle of slope or lead, there is provided a device which is entirely independent of the elements of the involute checking device, and in which one arm of an angle lever moves the work piece to be checked in the direction of its axis, whereas the other arm of said lever, which arm is adjustable as to its effective length, displaces a carriage at a right angle with regard to the axis of the work piece to be checked. On this carriage, a branch of an endless steel band is moved which passes over two discs one of which is arranged on the receiving spindle for the work piece to be checked. This steel band imparts upon the spindle with the work piece to be checked after corresponding adjustment of the lever length, a helical movement necessary for a longitudinal movement of the spindle, which helical movement is, in conformity with the angle of slope or lead of the work piece to be checked. Due to the fact that the start of the movement during the checking of the involute is effected on a carriage connected to a large rolling segment by rolling belts, and the transfer lever has to drive only an easily movable measuring carriage, there exists no lower limit for the base circle diameter to be adjusted, which means that the base circle diameter can be adjusted down to zero. However, the checking range of the angle of slope or lead has an upper limit which is inherent to the structure of this device and is all the lower, the smaller the gear diameter. This device has the additional drawback that the work piece to be checked which, when it has greater dimensions may be rather heavy, has to carry out both movements, which result in the relative helical movement of the measuring feeler on its flank so that the work piece to be checked has to be lifted inasmuch as its axis in the apparatus is vertical.

According to still another heretofore known apparatus of the general type involved, two carriages are displaceably arranged on a guiding track which is perpendicular to the axis of the work piece to be checked, one of said carriages partially embracing the other carriage. The embracing carriage is adapted to be driven and carries a straight guide which is angularly adjustable, and also carries a rolling ruler. The inner carriage, which is freely displaceable on the guiding means and is adapted to be clamped fast thereon, is provided with a straight guide arranged parallel to the axis of the work piece to be checked and carrying a drivable carriage carrying the measuring feeler. This last-mentioned carriage guides itself by means of a sliding block in the angularly adjustable guiding means of the embracing carriage. The rolling ruler is in engagement with a rolling disc which is connected to the spindle supporting the work piece to be checked.

With this apparatus, it is possible, for purposes of checking the involute, to employ a rolling disc with the diameter of the base circle or with a diameter deviating from the diameter of the base circle to a certain extent. In the first instance, only the embracing carriage with the rolling ruler is driven, whereas in the second instance the embracing carriages as well as the measuring feeler carriage guided parallel with regard to the axis of the work piece to be checked, are driven. With corresponding angular adjustment of the straight guide on the embracing carriage, said straight guide imparts upon the measuring feeler the additional tangential differential speed which is required for compensating for the difference in the diameter of the rolling disc and of the base circle. Thus, the effective base circle diameter is, within a certain range in the neighborhood of the diameter of the employed rolling disc, adjustable in an infinitely variable manner. With this design, the angle of slope can be adjusted or measured over the entire range from 0 to 90° in an infinitely variable manner. This is due to the fact that with a corresponding adjustment of the angularly adjustable straight guide, the maesuring movement can be initiated either on the carriage, which is parallel to the axis of the gear (angle of slope from 0 to 45°) or may be initiated on the embracing tangential carriage (angle of slope of from 45° to 90°, which means pitch angle of from 0 to 45°), while the inner carriage which carries the measuring feeler guiding means is clamped fast on the guide for said inner carriage. This arrangement has the drawback that in spite of the rangewise stepless adjustability of the base circle, a greater number of rolling discs is required when checking the involutes of gears with greatly differing base circle diameters. Due to the fact that when carrying out the checking operation with a rolling disc different from the base circle diameter, the feeler does not move along a front plane but, due to the simultaneously occurring tangential and axial movements moves over the tooth flank along a helical line, a certain minimum tooth width is required for the checking of the entire tooth height.

It is an object of the present invention to provide an apparatus for checking the tooth flanks, especially of involute straight and helical spur gears, which will overcome the above-mentioned drawbacks.

It is another object of this invention to provide an apparatus as set forth in the preceding paragraph which will permit a stepless adjustability for the base circle diameter from zero up to the maximum value within the application range for the checking of the involute.

It is also an object of this invention to provide an apparatus as set forth in the last paragraph which will additionally permit a stepless adjustability for the angle of slope within the range of from 0 to 90°.

It is a further object of this invention to provide an apparatus as set forth above, which will make it possible to check or feel the involute over the entire stepless adjustability range in a plane (front plane) which is perpendicular to the axis of the gear.

Still another object of this invention consists in the provision of the apparatus outlined above, which will make it possible at any time to check the results obtained by measuring with a steplessly adjusted base circle so that a self-control of the apparatus over the entire measuring range will be assured.

These and other objects and advantages of the invention will appear more clearly from the following specification in connection with the accompanying drawing, in which.

As mentioned above, the present invention concerns a device for checking the tooth flanks of involute spur and helical spur gears with a first carriage movable on guiding means at a right angle to the gear to be checked, and with a second carriage operable by a spindle and partially embracing said first carriage. Said second carriagfe is provided with an angularly adjustable straight guide arranged in a plane tangential to the axis of the gear to be checked. The apparatus is furthermore equipped with a third movable carriage carrying the measuring feeler and guided on the first carriage parallelly with regard to the axis of the gear to be checked. Said third carriage is simultaneously by means of a sliding block guided in the angularly adjustable straight guide of said second carriage. The apparatus according to the present invention is characterized by a fourth movable slide which is guided at a right angle to the first and second carriage and is provided with a second angularly adjustable straight guide. Said second angularly adjustable straight guide includes a sliding block which is linked to the embracing second carriage. Connected to said fourth carriage are one or more rolling rulers which are selectively pressed against rolling discs associated therewith and fixedly mounted in the device while being coaxial with the gear to be checked and coupled thereto. In addition thereto, the apparatus according to the invention is equipped with a second rolling ruler connected to the embracing carriage and adapted to roll on a rolling disc adjustably connectable to the spindle for the work piece to be checked.

Figure 1:
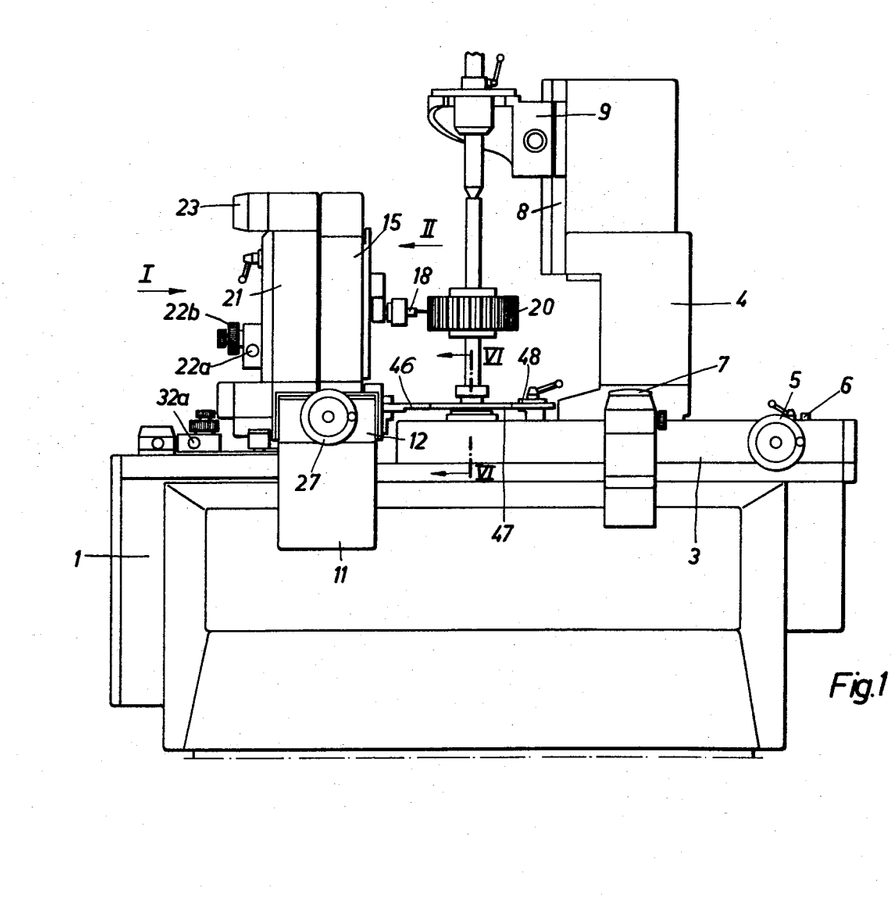
FIGURE 1 is a side view of an apparatus according to the present invention for checking the tooth flank of involute spur gears.
Figure 2:
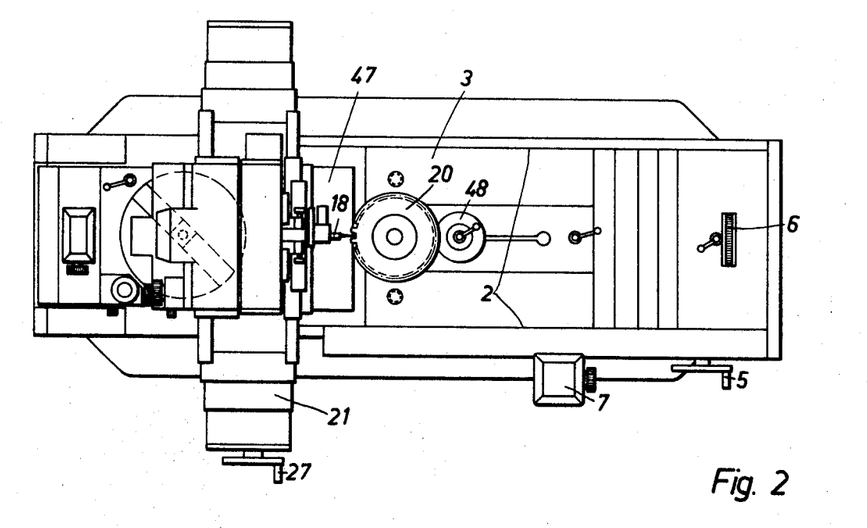
FIGURE 2 is a top view of FIGURE 1, while the work piece holder has been omitted.
Figure 3:
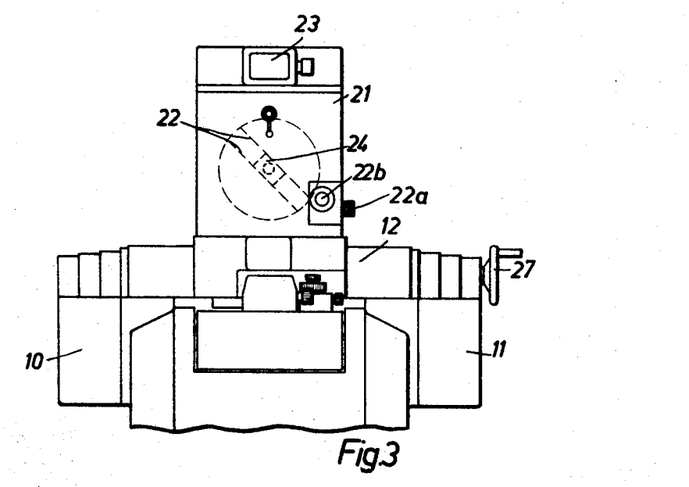
FIGURE 3 is a partial view of FIGURE 1 as seen in the direction of the arrow I in FIGURE 1.
Figure 4:
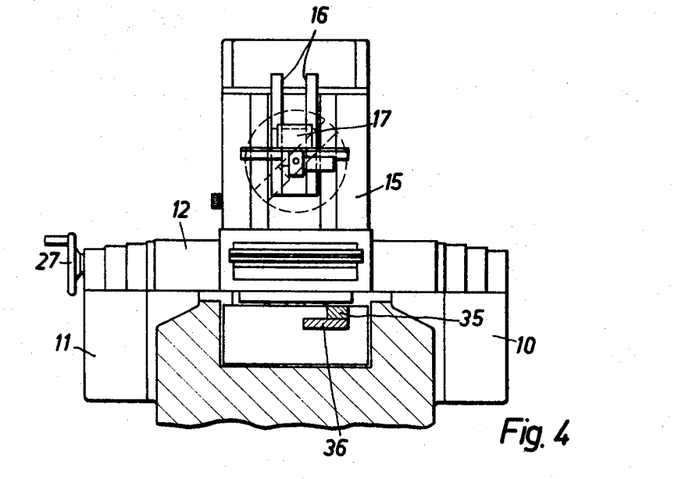
FIGURE 4 is a partial view of FIGURE 1 as seen in the direction of the arrow II thereof.

Referring now to the drawing in detail, the apparatus illustrated therein comprises a bed 1 the upper side of which is provided with guiding means 2 in which is adjustably arranged a work piece carriage 3 with a work piece holder 4 for adjusting the base circle radius of the work piece to be checked. This adjustment of the base circle radius may be effected by means of a hand-wheel 5 with a fine adjustment on a knurled disc 6. The adjustment can be read by means of an optical system 7 on a divided scale (not shown in the drawing). Work piece holder 4 carries a bearing 9 for a work piece receiving mandrel, said bearing 9 being adjustable on a vertical guiding track 8. The front portion of bed 1 (on the left-hand side in FIGS. 1 and 2) has a guiding beam 12 between two laterally arranged supports 10 and 11 which are screwed to the bed. Movably mounted on beam 12 are an inner carriage 13 (FIG. 5) and furthermore a carriage 14 partially embracing carriage 13. Carriages 13 and 14 are movable on balls 13a, as clearly shown in FIG. 5. Inner carriage 13 is provided with an upwardly extending extension 15 with an inner guiding track 16 extending vertically and parallel to the axis of the work piece to be checked. Within said guiding track 16 there is on rollers 16a movably arranged a carriage 17 with an electro-inductive measuring feeler 18. Feeler 18 has a feeler edge or feeler point 19 for contacting with the flank of the work piece 20 to be checked. During an involute checking operation, edge 19 engages the flank of work piece 20 in a tangential plane on the base cylinder. Embracing carriage 14 has an upwardly directed extension 21 in which is provided a straight guide 22 which is angularly adjustable in conformity with a pitch circle. The angular adjustment of said straight guide 22 is effected from the outside by a knob 22a (FIG. 3) and a gear train generally designated 22b meshing with the outside of said guide 22. Straight guide 22 will be parallel to the axis of the work piece to be checked when the reading indicates zero position. The angular position of straight guide 22 can be read by optical means through an observation window 23. Straight guide 22 has guided therein a sliding block 24 which is rotatably linked on carriage 17.

Figure 8:
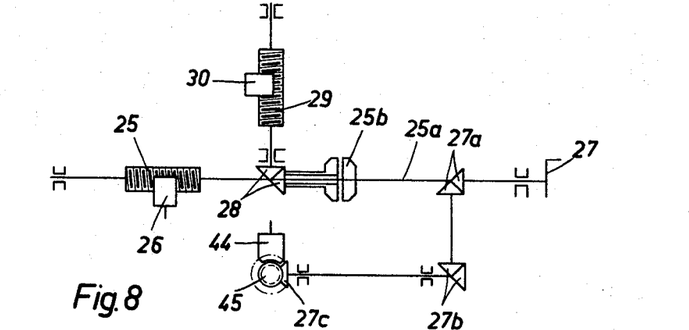
FIGURE 8 is a diagrammatical plan of the gearing of the device.

Embracing carriage 14 is adjustable on guiding beam 12 transverse to the axis of the work piece to be checked by means of a spindle 25 and a nut 26 adapted selectively disc 47 on the receiving mandrel in the manner common with devices having exchangeable base circle discs, in the present instance it is possible to carry out a measuring by initiating the measuring movement on the embracing carriage 14. There also exists the possibility to check the involute by means of a mounted rolling disc the diameter of which differs to a certain extent from the base circle of the workpiece to be tested. In this instance the tangential velocity of the measuring feeler with regard to the tangential velocity of carriage 14 which is driven in this instance is to be reduced or increased, depending on whether the base circle of the workpiece to be tested is smaller or greater than the diameter of the employed rolling disc 47. To this end, simultaneously with carriage 14 also carriage 17 is driven by engaging nut 30 and clutch 25b (FIG. 8). If the straight guide 22 on carriage 14 is adjusted so as to form an angle $\varphi_g$ with regard to the vertical plane, i.e. with regard to the plane parallel to the axis of the workpiece to be checked, a relative movement with regard to carriage 14 is imparted upon inner carriage 13 by means of block 24 which is displacing itself in straight guide 22. The tangential velocity of the measuring feeler guided in carriage 17 at a right angle with regard to the movement of carriage 13 is thus increased or reduced with regard to the tangential velocity of carriage 14. If the displacing velocity of carriage 14 is designated with $v_{14}$ which in this instance corresponds to the circumferential velocity $v_w$ of the rolling disc 47, and if $v_{17}$ designates the velocity of carriage 17 while it is assumed that $v_{17}$ in view of the built-in transmission ratio equals $i \times v_{14}$, and if $v_g$ represents the circumferential velocity of the workpiece to be tested, there exists the following relationship:

$$\tan \varphi_g = \frac{v_g - v_w}{i \cdot v_w} \cdot \frac{d_g - d_w}{i \cdot d_w} \quad (2)$$

For testing the tooth angle, the measuring feeler has to be displaced parallelly with regard to the axis of the workpiece to be tested, and the said workpiece has simultaneously to be turned so that the circumferential velocity $v_g$ of its base circle and the velocity of the measuring feeler 18 which corresponds to the velocity $v_{17}$ of carriage 17 in guiding means 16 will meet the requirement $$v_g = v_{17} \cdot \tan \beta_g \quad (3)$$

in which $\beta_g$ represents the angle of slope (helix angle) on the base circle of the workpiece to be tested. On the other hand, when straight guide 22 on carriage 14 is adjusted in conformity with an angle $\varphi_\beta$, carriage 14 is displaced through block 24 at a speed $$v_{14} = v_{17} \cdot \tan \varphi_\beta \quad (4)$$

If the testing machine, was prior to the measuring of the tooth angle, adjusted for measuring the involute, then, as mentioned above, $v_{14} = v_g$, and from the Equations 3 and 4 supra there will result $$\varphi_\beta = \beta_g \quad (5)$$

Adjusting angle of straight guide 22 thus corresponds to the angle of slope on the base circle of the workpiece to be tested. The drive of the measuring movement will be initiated on carriage 17 for $\beta_g$ and thus $\varphi_\beta$ is less than 45°. In other words, nut 30 is closed and nuts 26 and 44 are opened so that carriages 14 and 31 can follow the movement. In this connection, in order to assure that measuring feeler will move parallel to the axis of the wheel, carriage 13 is clamped fast on guide beam 12.

If $\beta_g$ is in excess of 45°, which means that the pitch angle of the workpiece to be tested is between 0 and 45°, the drive of the measuring movement is initiated on carriage 14. In other words, nut 26 is closed and nut 30 is opened so that carriage 17 can follow the movement.

This adjustment also applies when the measuring operation is carried out not with the stepless base circle adjustment but by applying a rolling disc mounted on the receiving mandrel base or on the base diameter of the workpiece to be tested (base circle disc).

If with a stepless adjustment of the base circle diameter, the base circle diameter of the workpiece to be tested is less than the diameter of the employed rolling cylinder 37 or 38, the angle $\varphi_w$ will be greater than 45° when checking the involute. In this instance, it is not possible to drive from carriage 14 through straight guide 32 to carriage 31. Straight guide 32 will, therefore, in this instance be adjusted for the tooth angle for an angle $\varphi_k$ greater $\leq 45°$. The velocity of carriage 14 will then be $$v_{14} = v_{31} \cdot \cot \varphi_k = v_w \cdot \cot \varphi_k = v_g \cdot \frac{d_w}{d_n} \cdot \cot \varphi_k$$

With this expression it will be clear from Formulas 3 and 4, there will for angle $\varphi_\beta$ in conformity with which the straight guide 22 is to be adjusted in this instance, follow the relationship $$\tan \varphi_\beta = \frac{d_w}{d_g} \cdot \frac{\tan \beta_g}{\tan \varphi_k} \quad (6)$$

Depending on whether $\varphi_\beta$ with the selected $\varphi_k$ is less or greater than 45°, the drive is initiated on carriage 17 or on carriage 14.

As will be evident from the above, the apparatus according to the present invention is characterized in that it affords a stepless adjustability for the base circle diameter from zero to the largest value within the application range for the checking of the involute. Moreover, the apparatus according to the present invention permits a stepless adjustment of the angle of slope within the range of from 0 to 90°. The involute will be sensed or scanned over the entire stepless adjusting range in a plane perpendicular to the axis of the gear to be tested.

In addition thereto, due to the fact that with the apparatus according to the invention, precise base circle discs can be employed for the checking of the involute, the present invention makes it possible to check the results obtained during the measurement of the steplessly adjusted base circle. In this way, a self-control of the device is possible over the entire measuring range.

It is, of course, to be understood, that the present invention is, by no means, limited to the particular arrangements shown in the drawings, but also comprises any modifications within the scope of the appended claims.

What is claimed is:

1. An apparatus for checking the tooth flanks of straight and helical gears with involute teeth comprising: gear support means for supporting a gear to be checked on a predetermined axis, a carriage moveable in a direction perpendicular to said axis and having feeler means thereon for engagement with the flank of a gear tooth of a gear on said gear support means, a ruler means, means operatively connecting said ruler means to said carriage for movement therewith also in a direction perpendicular to said axis, disc-like rolling cylinder means fixed to said gear support means on said axis, means for effecting substantially slip-free frictional engagement of said ruler means with said cylinder means to cause rotation of a gear on said gear support means simultaneously with movement of said carriage in its said direction, said ruler means comprising a first ruler member fixed to the carriage so as to take the same movement as the carriage and at least second and third ruler members, said means operatively connecting said ruler means to said carriage including motion transmitting means connecting the carriage to said second and third ruler members and adjustable for varying the amount of movement of the second and third ruler members for each unit of movement of the carriage, said cylinder means comprising a cylinder member for engagement by each said ruler member, and means for effecting selective engagement of the ruler members with their respective cylinder members, at least the cylinder members engageable by said second and to be made effective and ineffective. To this end, spindle 25 is driven either by a motor (not shown in the drawing) or by manually operating a hand-wheel 27. Spindle 25 is adapted through the intervention of a pair of bevel gears 28 to drive a spindle 29 by means of which through an engageable and disengageable nut 30, carriage 17 may be displaced in the guiding track 16 parallelly with regard to the axis of the work piece to be checked.

Figure 5:
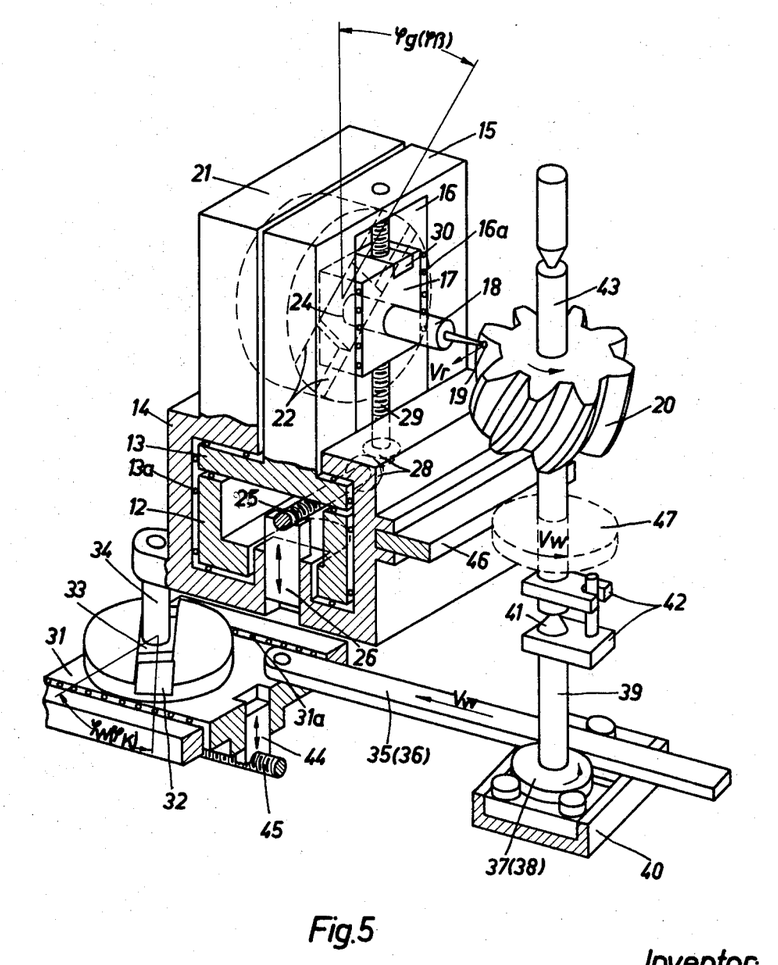
FIGURE 5 is an isometric diagrammatic illustration of the elements which bring about the measuring movements.
Figure 6:
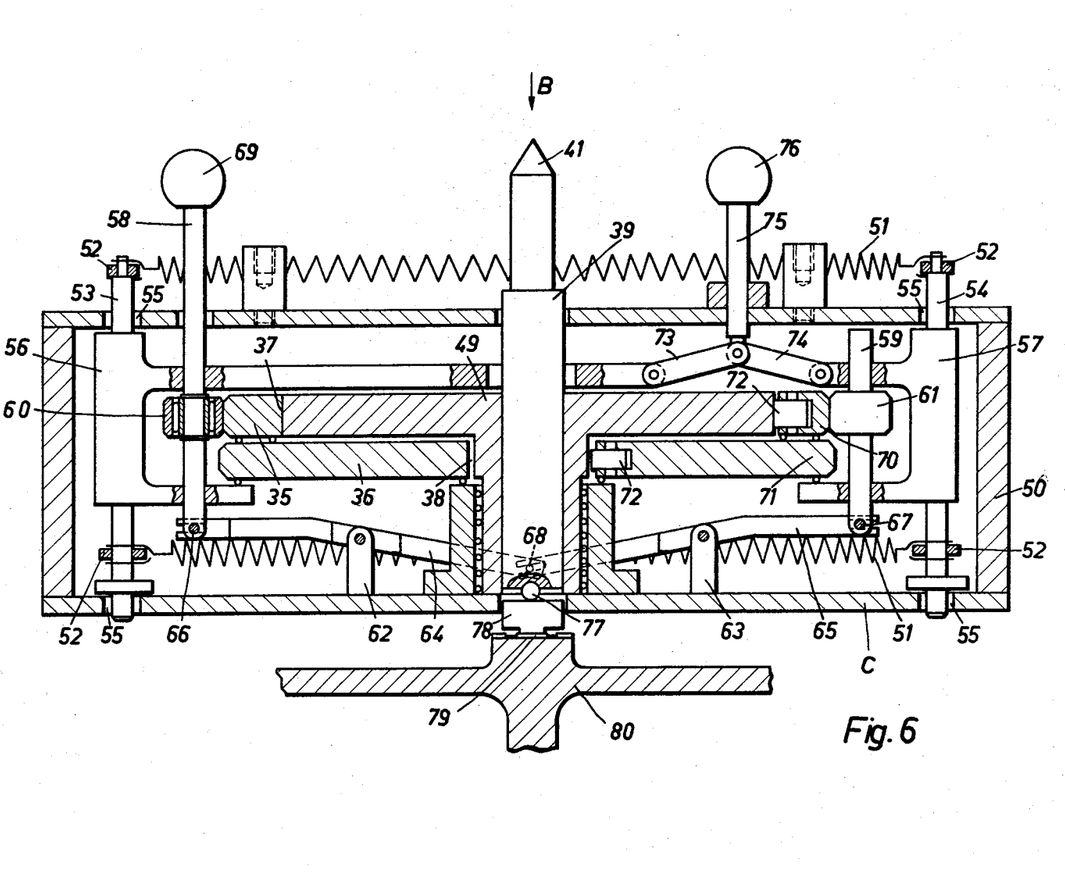
FIGURE 6 represents a section along the line VI—VI of FIGURE 1.

In bed 1 below guiding beam 12 there is provided a carriage 31 which is movable on rollers 31a in radial direction toward the axis of the work piece to be tested, by which means it is guided at a right angle with regard to carriages 13 and 14. Carriage 31 is provided with an angularly adjustable straight guide 32. The angular adjustment of straight guide 32 is effected from the outside by a knob 32a and a gearing not shown similar to that for straight guide 22. A block 33 which is slidable in said straight guide 32 is through the intervention of a bolt 34 pivotally connected to the embracing carriage 14. Carriage 31 has pivotally connected thereto two rolling rulers 35 and 36 (FIG. 6)—in the diagrammatic illustration of FIG. 5 one rolling ruler only is shown—which rulers are adapted selectively to be pressed against two rolling discs 37 and 38 in FIG. 5 only one disc is shown mounted on receiving spindle 39. This pressing action may be effected by means of a clamping device 40 which is shown in FIG. 5 and will be described further below. Receiving spindle 39 with a point 41 is coupled through the intervention of a follow-up member 42 to work piece 20 to be tested, said work piece 20 being carried by a receiving mandrel 43. Carriage 31 is adapted to be driven by a spindle 45 through the intervention of a nut 44 adapted selectively to be engaged and disengaged. Spindle 45 may be driven by manually operating hand-wheel 27, or by a motor (not illustrated). A magnetic operated clutch 25b on shaft 25a (FIG. 8) which is of one piece with spindle 25 is adapted to connect or disconnect spindle 29 with driving shaft 25a by bevel gears 28 shown in diagrammatical manner in FIG. 5. Nuts 26, 30 and 44 are operated by electromagnets (not shown) and push buttons on the switchboard of the machine.

Embracing carriage 14 has connected thereto a rolling ruler 46. This ruler is adapted to roll on a rolling disc 47 with the base circle diameter of the work piece to be tested, said disc 47 being mountable upon the receiving mandrel for the work piece to be tested. The driving force required for the frictional movement is, during the movement of the work piece carriage against the rolling ruler, brought about without load on the bearing for the receiving spindle, by pressing a roller 48 (FIG. 2) which is resiliently journalled on the work piece carriage, against that circumferential portion of rolling disc 47 which is located diametrically oppositely with regard to the contact point of rolling ruler 46 and rolling disc 47.

Figure 7:
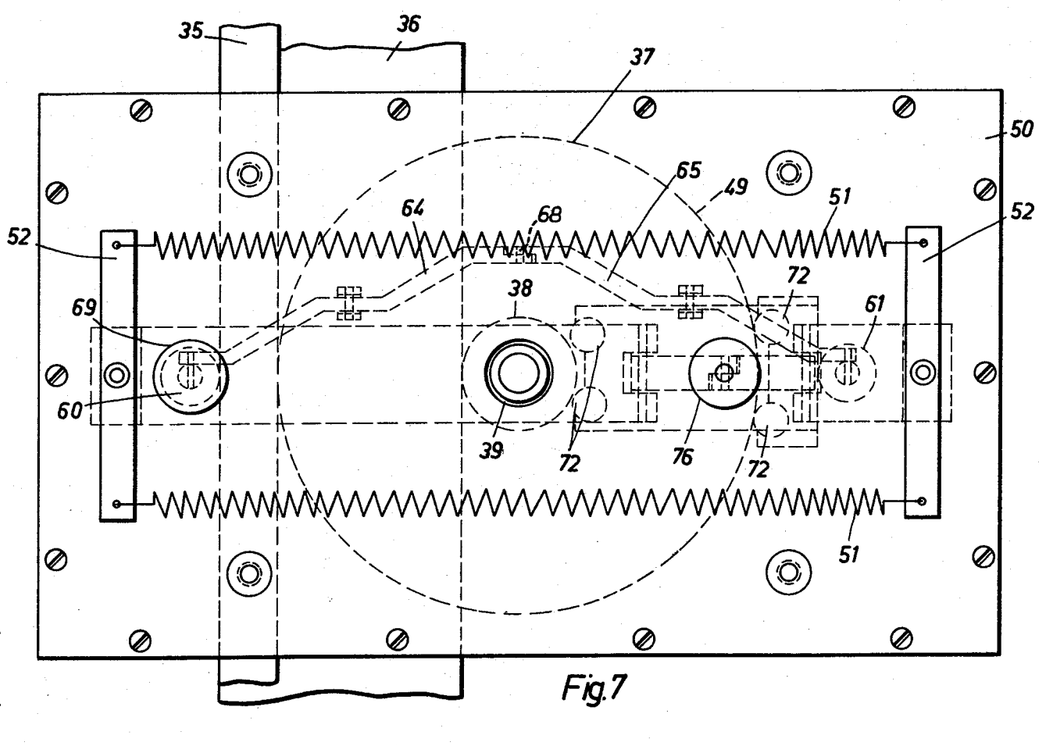
FIGURE 7 is a top view of FIGURE 6 as seen in the direction of the arrow B thereof.

The pressing force required for the practically slipless frictional engagement and movement of rulers 35 and 36 and discs 37 and 38 is produced, without back effect, upon the bearing of the receiving spindle 39, by the clamping means 40 diagrammatically shown in FIG. 5. The design of said clamping means 40 is best seen from FIGS. 6 and 7. A rolling body 49 with two precisely round ground cylindrical surfaces 37 and 38 of different diameters—is pressed upon the receiving spindle 39. Rolling body 49 is journalled on a lower cover of a housing 50 which is screwed fast to the bottom side of work piece carriage 2. Either one of the two rolling rulers 35 and 36 may selectively be pressed against the rolling cylinder 37 or 38 pertaining thereto with the force of the four tension springs 51. These springs are suspended on four levers 52 which are rotatably connected to bolts 53 and 54. On bolts 53 and 54 which are guided in longitudinal bores 55 of the upper and lower housing cover there are connected clamping bodies 56 and 57 in which longitudinally displaceable bolts 58 and 59 are guided. Axially non-displaceable pressure rollers 60 and 61 are journalled on bolts 58 and 59.

Two levers 64 and 65 journalled on supports 62 and 63 welded to the lower housing cover have their fork-shaped ends in engagement with pins 66 and 67 which are pressed into the lower ends of bolts 58 and 59. The other end of lever 64 has pressed therein a pin 68 which engraves a slot in lever 65. Bolt 58 has its upper end which protrudes from the housing provided with a ball-head 69 by means of which it can be pressed upwardly and downwardly whereby ruler 60 is moved either in front of the upper 35 or lower rolling ruler 36. At the same time, bolt 59 with roller 61 is in a corresponding manner displaced through the intervention of levers 64 and 65. Roller 61 will thus be moved either in front of an upper or a lower pressure body 70, 71 respectively. Journalled on pressure bodies 70 and 71 are two rollers 72 each for the transmission of the pressing force upon the upper or lower rolling cylinder 37 or 38 of the rolling body 49. Two stilts 73 and 74 are pivotally connected to clamping bodies 56 and 57. The said stilts 73 and 74 have their other ends pivotally connected to a longitudinally displaceable bolt 75 with ball-head 76. By pressing bolt 75 downwardly into the dead center position of the elbow levers formed by said stilts, the clamping bodies are pressed apart against the thrust of the springs, and rollers 60 and 61 are lifted off the rolling rollers or cylinders. The changeover from one rolling transmission ratio to the other rolling transmission ratio can be easily effected by pressing and lifting knob 69.

Receiving spindle 39 rests through a ball 77 on a pressure member 78 arranged in the lower housing cover C. When the work piece carriage 3 is displaced, pressure member 78 is taken along and rolls on a longitudinal antifriction bearing 79 on a supporting bar 80 provided in the bed of the machine. This arrangement relieves work piece carriage 3 completely from the work piece weight, which is considerable with large gears, whereby all elastic deformations and the displacements of the receiving spindle as they are inherent thereto, and also the displacements of the rolling elements which are important for the measuring precision, will be avoided.

The testing machine according to the present invention for testing the involute operates in the following manner: After the work piece to be checked has been mounted, the operator selects the suitable rolling transmission ratio by actuating knob 69. For gears in the lower portion of the application range, the smaller rolling cylinder 38 with the rolling ruler 36 is employed, whereas for larger gears the greater rolling cylinder 37 with the rolling ruler 35 is employed. If the base circle diameter of the work piece to be tested is less, equals or is in excess of that of the rolling disc, the tangential velocity $v_T$ of the measuring feeler which has to equal the frictional velocity $v_g$ at the base circle of the work piece to be checked must be smaller, equal to or greater than the displacing velocity $v_w$ of the rolling ruler. The adjusting angle of the straight guide 32 with regard to the direction of displacement of the embracing carriage 14—said angle being designated with $\varphi_w$ in FIG. 5—has in these instances to be greater, equal or less than 45°, because the circumferential velocities of the rolling cylinder $v_w$ on the base circle $v_g$ are related to each other as the ratio of the diameters. When designating the diameter of the roller disc with $d_w$, and designating the diameter of the base circle of the work piece to be tested with $d_g$, the following relationship exists:

$$\tan \varphi_w = \frac{v_{31}}{v_{14}} = \frac{v_w}{v_g} = \frac{d_w}{d_g} \quad (1)$$

If $\varphi_w$ is less than 45°, the drive will be initiated on the embracing carriage 14, when $\varphi_w$ is greater than 45° on carriage 31.

If, for purposes of controlling the device or because a greater number of the same type of gears is to be tested, the checking is to be carried out not by employing the stepless base circle adjustment but by employing a base circle disc, knob 76 is pressed downwardly so that the frictional connection between the built-in rolling discs and rolling rulers is interrupted. After mounting base circle trained a web to be dried, the first and third cylinders being proximate and the second cylinder being offset, whereby a pocket is formed between the web and the second cylinder, a pocket ventilator comprising nozzle means elongated parallel to the axes of the cylinders and disposed between the first and third cylinders in a position offset from said pocket, said nozzle means comprising slots directed at acute angles toward said web adjacent lines of tangency of said web to the first and third cylinders, said nozzle means being spaced from the first and third cylinders with sufficient clearance to pass irregularities in said web, such portion of the flow from said nozzle means as escapes through the space between the nozzle means and the first and third cylinders being required to reverse direction whereby to establish a seal in each such space to the extent of the inertia of the air in each such space to the extent of the inertia of the air flow changing direction, remaining flow from said nozzles establishing static pressure in the pocket for forcing air toward the second cylinder to be discharged from the ends of the pocket.

6. A pocket ventilator according to claim 5 in which partial closure means substantially closes the ends of the space between the nozzle means and the first and third cylinders whereby to direct into the pocket the air supplied by the nozzle means, and means for supplying air to the nozzle means in sufficient volume in excess of all leakage from said space to force air to the pocket adequate for ventilation thereof.

7. A ventilator according to claim 5 in which the means for delivering air includes means for rendering air flow from the nozzles substantially uniform throughout the width of the web.

8. A ventilator according to claim 5 in which the air delivering means includes a distributor plenum between the first and third cylinders and on which said nozzles are mounted, the said plenum partially filling the space between the first and third cylinders over which the web is trained, and being spaced from said first and third cylinders leaving clearances through which a part of the air discharged from said nozzles can escape about the first and third cylinders, the dryer section including a felt roll and a felt of limited porosity trained over the felt roll and the first and third cylinders, the air supplied from said nozzles establishing static pressure between the plenum and the felt passing about the first and third cylinders and the felt roll, such pressure constraining a substantial component of the air to pass through the felt into the pocket.

9. In a paper machine cylinder dryer section having a web of paper trained over first and third cylinders and an intervening second cylinder at a different level, thereby defining a pocket, a pocket ventilator comprising a plenum extending substantially continuously between the first and third cylinders for the width of the web and having air discharge slots substantially continuous for the width of the web and positioned to direct air oppositely toward said first and third cylinders, and against portions of the web which are adjacent portions thereof that are supported on said cylinders, means for supplying air in substantial volume and under pressure to the said slots and constraining it to flow with substantial uniformity throughout the length thereof from one side to the other of said web, means including the slots for establishing pneumatic seals between the plenum and the first and third cylinders whereby only a part of the said air can escape about the first and third cylinders, means for confining in a pressurized space between the plenum and the second cylinder and communicating with said pocket a component of the air adequately supplied in such volume from said nozzles, the pocket being open at both ends for the discharge of said component of air.

10. A dryer section according to claim 9 in which a felt roll intervenes between the plenum and the second cylinder, and a felt of limited porosity is trained over said roll and the first and third cylinders and has portions intervening between said pressurized space and said pocket and through which said air component passes for pocket ventilation.

11. A dryer section according to claim 10 in which the permeability of the felt is in a range of 50 to 250.

12. A dryer section according to claim 11 in which the permeability of the felt is in a range of 100 to 200.

13. In a dryer, the combination with two rows of drying cylinders, the cylinders being staggered in the respective rows and the cylinders in each row being closely proximate to each other and adapted to have a web to be dried trained alternately about the cylinders of said rows and defining pockets, each of which is bounded by one cylinder of one row and two cylinders of another row and the intervening web trained thereover, of means comprising a porous felt trained about said cylinders for holding the web thereto, a felt roll in each of said pockets about which the felt is trained, the felt extending tangentially from and to the cylinders of a given row and having an intermediate portion trained about the respective felt roll at each such pocket, and ventilating means for individual pockets and comprising in each such pocket a distributor plenum, means for delivering a dehydrating gas under pressure to said plenum, the said plenum having elongated slots which are substantially continuous transversely of the pocket for the full width of the said web, said slots being directed oppositely for the delivery of jets of gas against the felt and the cylinders over which runs of the felt are trained, the plenum having spaces between it and the last mentioned cylinders sufficient to pass any irregularities in the felt and the web to be dried and the direction of delivery of said jets being toward the pocket and at an acute angle to the felt runs adjacent the lines of tangency between the felt and the last mentioned cylinders whereby escaping air is required to turn upon itself, the inertia of such air tending to establish static pressure of a substantial component portion of the gas of said jets on the felt between said cylinders, a portion of the said gas serving to provide sealing resistance to flow between the plenum and the adjacent cylinders in a direction away from the felt roll, another substantial component of the gas being forced thereby to flow through the felt between the felt roll and the cylinders over which the felt is trained, such gas ventilating the pocket and being constrained to escape in substantially equal amounts from opposite ends of the pocket.

14. A dryer for a felt-supported web and comprising first, second and third cylinders over which is trained a web to be dried, the first and third cylinders being proximate with narrow intervening space in one tier and the second cylinder being offset in a different tier, whereby a pocket is formed between the moving portions of the web and second cylinder, the said web portions constituting the sides of the pocket, a porous felt trained over the first and third cylinders and having a bight extending into the pocket, a felt roll in said bight and about which the felt passes, and a pocket ventilator comprising means for developing a static head of pressure of drying gas in the bight of the belt, said head being sufficient to force the gas through the felt into the pocket for the drying of the moving web portions at the sides of the pocket, the said means for establishing a static head of pressurized gas including a plenum extending longitudinally of the bight between the first and third cylinders, said plenum including nozzle means for discharging drying gas into said bight for substantially the length of the bight between said first and third cylinders, the plenum further comprising means extending across the space between the first and third cylinders for restricting escape of gas from said bight along the surface of the felt trained over said cylinders, means extending from said last means and free of contact with the felt for restricting flow from the ends of the bight, the head of pressure thus established in the bight being sufficient to force drying gas through the porous felt into the pocket for the drying of the web portions constituting the sides of the pocket, the ends of the pocket beyond said felt roll being open for the escape of used drying gas.

15. A dryer for a moving web, said dryer comprising first, second and third cylinders over which is trained a web to be dried, first and third cylinders being proximate with narrow intervening space in one tier and the second cylinder being offset in a different tier, whereby a pocket open at its ends is formed between the portions of the moving web and the second cylinder, the web constituting the sides of the pocket, means for developing a static head of pressure of drying gas in the pocket, said means including a plenum in the said space between the first and third cylinders and having nozzle means extending longitudinally of the pocket for directing drying gas into the pocket for substantially the full width of the web, said plenum comprising means extending across part of the space between said cylinders for so restricting said space as to permit substantial static head to be developed in said pocket, and means extending from said plenum across the portions of the ends of the pocket which are nearest to said plenum for restricting endwise flow of gas from the pocket to require such endwise flow to occur through portions of the pocket which are remote from the plenum, thereby to require a major portion of such gas to contact the surfaces of those portions of the moving web which constitute the sides of the pocket.

References Cited

UNITED STATES PATENTS

| | | | |
|---|---|---|---|
| 1,199,394 | 9/1916 | Liebeck | 34—111 |
| 1,298,655 | 4/1919 | Briner | 34—114 |
| 1,660,640 | 2/1928 | Asten | 34—111 X |
| 2,199,233 | 4/1940 | Williams | 34—157 X |
| 3,302,304 | 2/1967 | Goldenberg et al. | 34—159 |

FOREIGN PATENTS

| | | |
|---|---|---|
| 598,111 | 2/1948 | Great Britain. |

FREDERICK L. MATTESON, JR., *Primary Examiner.*

A. D. HERRMANN, *Assistant Examiner.*